Patented Oct. 16, 1945

2,386,994

UNITED STATES PATENT OFFICE 2,386,994

METHOD OF PRODUCING DEXTRAN ACETATE

William Allshire Waldie, Oakwood, Ohio, and John Edward Bersuder, Warren, Pa., assignors to Chemical Developments Corporation, Dayton, Ohio, a corporation of Ohio No Drawing. Original application May 20, 1940, Serial No. 336,193. Divided and this application October 28, 1943, Serial No. 508,068

2 Claims. (Cl. 195—12)

This invention relates to the manufacture of dextran acetate, and is a division of copending application Serial No. 336,193, filed May 20, 1940.

The production of dextran by the action of bacteria of the Leuconostoc species has been disclosed and described in the copending applications 156,426, 156,427, 188,723 and 192,886, of Grant L. Stahly et al. (granted June 11, 1940, as Patents Nos. 2,203,702, 2,203,703, 2,203,704 and 2,203,705, respectively), and processes of etherification and esterification of dextran have been described therein, but the acetates of dextran have not been produced heretofore.

It is an object of this invention to devise a method of treating dextran to produce dextran acetate. This product is in the form of a white powder and may be fused to a brittle transparent resin.

Dextran is produced by inoculating media containing sucrose, nitrogenous compounds and various salts with bacteria of known genus and species. These bacteria may be placed in one of two groupings, those that produce polysaccharides known as levans, or those that produce the polysaccharides known as dextrans. The two types of polysaccharides are distinguished from one another by the fact that on hydrolysis with acids or enzymes, the dextrans yield only dextrose while the levans yield only levulose. As specific examples, Bacillus mesentericus, B. subtilis, B. megatherium, Pseudomonas pruni, Ps. prunicola or Ps. phaseoli may be employed for the production of the levan type of polysaccharide, while Leuconostoc mesenteroides or L. dextranicum may be used for the production of the dextran type.

The culture media employed must contain some sucrose; this can be either refined or crude sucrose, molasses or any similar sucrose containing material. Nitrogen may be added in the form of commercial peptone, beef extract or other nitrogen containing material. If molasses is used as the sucrose source, nitrogenous compounds in sufficient quantity are present in it so that none need be added. Salts such as dipotassium phosphate and sodium chloride are also added. As a specific example, a typical medium may contain: sucrose, 5-10%, peptone, 0.1%, dipotassium phosphate 0.2% and sodium chloride 0.1%. The pH of the medium preferably is adjusted to slightly on the alkaline side of neutrality.

The production of the polysaccharide is favored by keeping the reaction of the media slightly alkaline throughout the period of fermentation. This may be accomplished by the periodic addition of alkali to the fermenting media or by using an excess of calcium carbonate in the media. After inoculation the cultures are incubated at the temperature most favorable to the growth of the micro-organism being used. For one of the preferred forms, Leuconostoc mesenteroides, this temperature is around 25 degrees C. The progress of the fermentation may be followed by periodically removing samples of the fermenting culture media and precipitating the polysaccharide contained in them by the addition of three to five times their volume of alcohol. The precipitated polysaccharide may then be weighed. When a maximum of polysaccharide has been formed the culture media are ready for the etherification or esterification processes. The length of time necessary for the maximum of polysaccharide to be formed will vary with the organism employed, the temperature of incubation, the concentration of sucrose and other factors.

The polysaccharide may be isolated from the solution by precipitation with alcohol or acetone. Preferably the reaction of the fermented medium is first adjusted to the neutral point to lessen the possibility of hydrolysis of the polysaccharide, and the solution then concentrated under reduced pressure at a temperature of 40 to 50 degrees C. to approximately one-fourth its original volume. The solution is then poured, with stirring, into three to five times its volume of alcohol or acetone. The polysaccharide may be precipitated directly from the fermented culture media by the addition of alcohol or acetone, but it is then necessary to use a considerably larger amount of the precipitating agent.

For the preparation of the acetate of dextran it is preferable to first isolate the dextran from the culture medium in which it is formed. If desired, however, the necessary reacting ingredients may be added directly to the fermented medium containing the dextran and after completing the reaction recovering the dextran acetate.

The acetylation of cellulose by reacting the same with glacial acetic anhydride in the presence of glacial acetic acid and a catalyst is known and may be represented by the following reaction:

$$C_6H_{10}O_5 + 3(CH_3CO)_2 \rightarrow$$

The reaction represented by the above simple equation is in practice very greatly complicated by the complex chemical structure and physical characteristic of the cellulose and acetate product formed. Attempts to acetylate cellulose by using glacial acetic acid alone in the presence of catalysts have not proved successful.

After considerable experimentation it has been discovered that dextran can be acetylated by reacting the acetone precipitated product made by the action of bacteria on sucrose with a mixture of acetic anhydride and glacial acetic acid in the presence of a catalyst. Sulphuric acid is used as the catalyst but in order to avoid undue charring of the dextran only the minimum quantity of acid necessary is incorporated.

A typical example of the method employed comprises the following:

Example

To dextran produced by the action of bacteria of the Leuconostoc species as hereinbefore described is added a mixture of acetic anhydride and glacial acetic acid together with a small amount of sulphuric acid as a catalyst. When the mixture is heated together at a temperature of approximately 90° C. for two hours, dextran acetate is produced. The ratio of anhydride to acid employed was four to one and the amount of sulphuric acid, which is used in concentrated form may vary between 0.003% by weight and 0.01%. In the latter case, the acetate produced has a lower melting point but is of a darker color.

The dextran acetate produced as described is not soluble in the reaction mixture but separates out as a dark brown precipitate. This precipitate is washed free from acid and anhydride with water and dried to produce a white powder. The dextran acetate product produced in this manner has a faint brown tint and is insoluble in acetone, alcohol, cellosolve and ethyl acetate. The product when fused and cooled produces a brittle, transparent resin.

In place of concentrated sulphuric acid, phosphoric acid or mixtures of the two may be used as catalyst in preparing the dextran acetate from dextran as described.

Due to the chemical structural differences between dextran and similar polysaccharides such as cellulose, starch and the like, there is a greater tendency for dextran to char during the treatment than cellulose and the like and it appears that this produces a darker color product. Further, dextran differs from cellulose upon acetylation in that the dextran acetylated product remains insoluble in the reaction mixture while cellulose readily goes into solution and must be precipitated therefrom by the addition of water.

It will be understood that variations in amount of ingredients and temperatures may be made without departing from the spirit and scope of this invention as defined by the appended claims.

We claim:

1. In a method of producing dextran acetate, the steps of synthesizing the polysaccharide from a sucrose medium by a bacterium selected from the group consisting of *Leuconostoc mesenteroides* and *Leuconostoc dextranicum*, heating the resulting fermented culture medium with a mixture of acetic anhydride, glacial acetic acid, and sulfuric acid catalyst at approximately 90° C. for about two hours until the reaction is substantially completed, and thereafter separating dextran acetate therefrom, the ratio of acetic anhydride to glacial acetic acid being substantially 4:1 and the catalyst being present in amount from 0.003% to 0.01%

2. In a method of producing dextran acetate, the steps of synthesizing the polysaccharide from a sucrose medium by a bacterium selected from the group consisting of *Leuconostoc mesenteroides* and *Leuconostoc dextranicum*, heating the resulting fermented culture medium with a mixture of acetic anhydride, glacial acetic acid, and a catalyst consisting of one of the group sulfuric acid, phosphoric acid, and mixtures of phosphoric acid and sulfuric acid, to approximately 90° C. for about two hours until the reaction is substantially completed, and thereafter separating dextran acetate therefrom, the ratio of acetic anhydride to glacial acetic acid being substantially 4:1 and the catalyst being present in amount from 0.003% to 0.01%.

WILLIAM ALLSHIRE WALDIE.
JOHN EDWARD BERSUDER.